United States Patent
Berry, Jr. et al.

(10) Patent No.: US 7,793,125 B2
(45) Date of Patent: Sep. 7, 2010

(54) METHOD AND APPARATUS FOR POWER THROTTLING A PROCESSOR IN AN INFORMATION HANDLING SYSTEM

(75) Inventors: Robert Walter Berry, Jr., Round Rock, TX (US); Charles Ray Johns, Austin, TX (US); Christopher J. Kuruts, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 11/621,710

(22) Filed: Jan. 10, 2007

(65) Prior Publication Data

US 2008/0168287 A1 Jul. 10, 2008

(51) Int. Cl.
*G06F 1/32* (2006.01)
(52) U.S. Cl. .................. 713/320; 713/300; 713/322
(58) Field of Classification Search ............... 713/300, 713/310, 320, 322, 323, 324
See application file for complete search history.

(56) References Cited

U.S. PATENT DOCUMENTS

| | | | |
|---|---|---|---|
| 6,272,666 B1 | 8/2001 | Borkar et al. | |
| 6,363,490 B1 | 3/2002 | Senyk | |
| 6,393,374 B1 | 5/2002 | Rankin et al. | |
| 6,411,156 B1 | 6/2002 | Borkar et al. | |
| 6,415,388 B1 | 7/2002 | Browning et al. | |
| 6,484,265 B2 | 11/2002 | Borkar et al. | |
| 6,564,328 B1 | 5/2003 | Grochowski et al. | |
| 6,608,528 B2 | 8/2003 | Tam et al. | |
| 6,762,629 B2 | 7/2004 | Tam et al. | |
| 6,788,156 B2 | 9/2004 | Tam et al. | |
| 6,908,227 B2 | 6/2005 | Rusu et al. | |
| 6,931,559 B2 | 8/2005 | Burns et al. | |
| 2003/0117759 A1 | 6/2003 | Cooper | |
| 2003/0126478 A1 | 7/2003 | Burns et al. | |
| 2003/0126479 A1 | 7/2003 | Burns et al. | |
| 2003/0188211 A1 | 10/2003 | Chen | |

(Continued)

FOREIGN PATENT DOCUMENTS

| WO | PCT/US99/24194 | 5/2000 |
|---|---|---|
| WO | WO 2005/041007 A1 | 5/2005 |

OTHER PUBLICATIONS

Crepps—Improving Multi-Core Architecture Power Efficiency Through EPI Throttling and Asymmetric Multiprocessing, Technology @ Intel Magazine (Feb. 2006).

(Continued)

*Primary Examiner*—Dennis M Butler
(74) *Attorney, Agent, or Firm*—Matt Talpis; Mark P Kahler (57) ABSTRACT

A power system couples to a multi-core processor to provide power to the processor. The power system throttles at least one of the cores of the processor when the power that the processor consumes from the power system exceeds a predetermined threshold power. The power system may reduce the rate of instruction issue by a particular core or clock gate a particular core to provide power throttling. The power system dynamically responds to variance of the actual output voltage that processor circuitry receives from the power system in comparison to an expected output voltage over time and corrects for such variance.

20 Claims, 6 Drawing Sheets

U.S. PATENT DOCUMENTS

| | | |
|---|---|---|
| 2003/0204762 A1 | 10/2003 | Lee et al. |
| 2004/0071184 A1 | 4/2004 | Naveh et al. |
| 2004/0148528 A1 | 7/2004 | Silvester et al. |
| 2004/0158771 A1 | 8/2004 | Garnett et al. |
| 2005/0044434 A1 | 2/2005 | Kahle et al. |
| 2005/0102544 A1 | 5/2005 | Brewer et al. |
| 2005/0138438 A1 | 6/2005 | Bodas |
| 2005/0166075 A1 | 7/2005 | Hack |
| 2005/0283624 A1 | 12/2005 | Kumar et al. |
| 2006/0020831 A1 | 1/2006 | Golla et al. |
| 2006/0026447 A1 | 2/2006 | Naveh |
| 2006/0095807 A1* | 5/2006 | Grochowski et al. ........ 713/324 |
| 2006/0149975 A1 | 7/2006 | Rotem |
| 2007/0050646 A1* | 3/2007 | Conroy et al. ............... 713/300 |

OTHER PUBLICATIONS

Felter—A Performance-Conserving Approach for Reducing Peak Power Consumption in Server Systems, ICS'05 (Jun. 2005).

Hofstee—Power Efficient Processor Architecture and the Cell Processor, IEEE HPCA (Nov. 2005).

Intel-1—VRM 9.0 DC-DC Converter Design Guidelines, Intel (Apr. 2002).

Intel-2—Embedded Voltage Regulator-Down (EmVRD) 11.0, Intel Design Guidelines (Aug. 2006).

US 6,330,680, Dec. 11, 2001, Browning et al. (withdrawn).

IBM—"PCT International Search Report", International Application No. PCT/EP2007/064261 (Dec. 23, 2008).

* cited by examiner

METHOD AND APPARATUS FOR POWER THROTTLING A PROCESSOR IN AN INFORMATION HANDLING SYSTEM

TECHNICAL FIELD OF THE INVENTION

The disclosures herein relate generally to processor power systems, and more particularly, to processor power systems that employ throttling techniques to prevent the processor system from exceeding predetermined operational parameters.

BACKGROUND

Modern information handling systems use processors that typically generate a substantial amount of heat. Thermal throttling techniques exist that sense the temperature of the processor. When the processor's temperature exceeds a predetermined threshold, the system throttles or reduces the processor's clock rate to correspondingly reduce the processor's temperature. In this manner, the system prevents undesirable overheating. Alternatively the system may employ clock gating, i.e. stopping the processor's clock, to reduce the processor's temperature.

Power consumption is a limiting factor in current day processor power system design. The system designer typically designs a processor power system to provide up to a predetermined maximum power limit that the processor may consume. During processor manufacture, the manufacturer may test to determine if a processor operating at a sample workload power exceeds the maximum power limit. The manufacturer may reject those processors that exceed the maximum power limit while running a sample workload. Unfortunately, it is possible that a real world workload using real world software applications may exceed the sample workload power limit. To address this situation, a system may employ an artificial maximum power workload limit. However, using such an artificial maximum power workload limit may either decrease processor yield or require the system to provide more power to the processor. Both of these approaches undesirably increase system cost.

Modern information handling systems (IHSs) often employ a voltage regulator module (VRM) to control the voltage or power that a power source provides to the processor of the IHS. VRMs typically include a voltage ID (VID) register that controls the output voltage of the VRM. The VRM supplies the processor with an output voltage that depends on the VID value that the VID register stores. In this manner, the same VRM model may supply multiple processors that have different voltage needs. Unfortunately, the values or attributes of IHS components such as the processor and power system may vary or drift over time. A VID value that instructs the VRM to output a particular desired voltage when the IHS manufacturer builds the IHS may not result in the proper supply voltage in the future. This is due to the tendency of components to shift values over time.

SUMMARY

What is needed is a method and apparatus that address the problems above.

Accordingly, in one embodiment, a method is disclosed for providing power to a processor that includes processor circuitry on a semiconductor substrate. The method includes supplying, by a power system, power to the processor wherein the processor circuitry includes a plurality of cores. The method also includes throttling, by the power system, at least one core of the processor if the power that the processor consumes from the power system exceeds a predetermined threshold power, thus placing the processor in a power throttled mode. The method also includes determining, by the power system, an actual output voltage that the processor circuitry in the processor receives from the power system. The method further includes varying, by the power system, the actual output voltage dynamically over time in response to a detected difference between the actual output voltage and an expected output voltage of the power system.

In another embodiment, a processor system is disclosed that includes a processor and a power system. The processor includes processor circuitry having a plurality of processor cores situated on a semiconductor substrate. The power system couples to the processor and supplies power to the processor. The power system includes a power controller that throttles at least one core of the processor if the processor consumes more than a predetermined threshold power, thus placing the processor in a power throttled mode. The power system also includes a sensor that couples to the processor circuitry and the power controller. The sensor senses an actual output voltage that the processor circuitry receives from the power system. The power system also includes a voltage regulator that couples to the power controller and the processor. The voltage regulator varies the actual output voltage dynamically over time under the control of the power controller in response to a difference the power controller detects between the actual output voltage and an expected output voltage of the voltage regulator.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
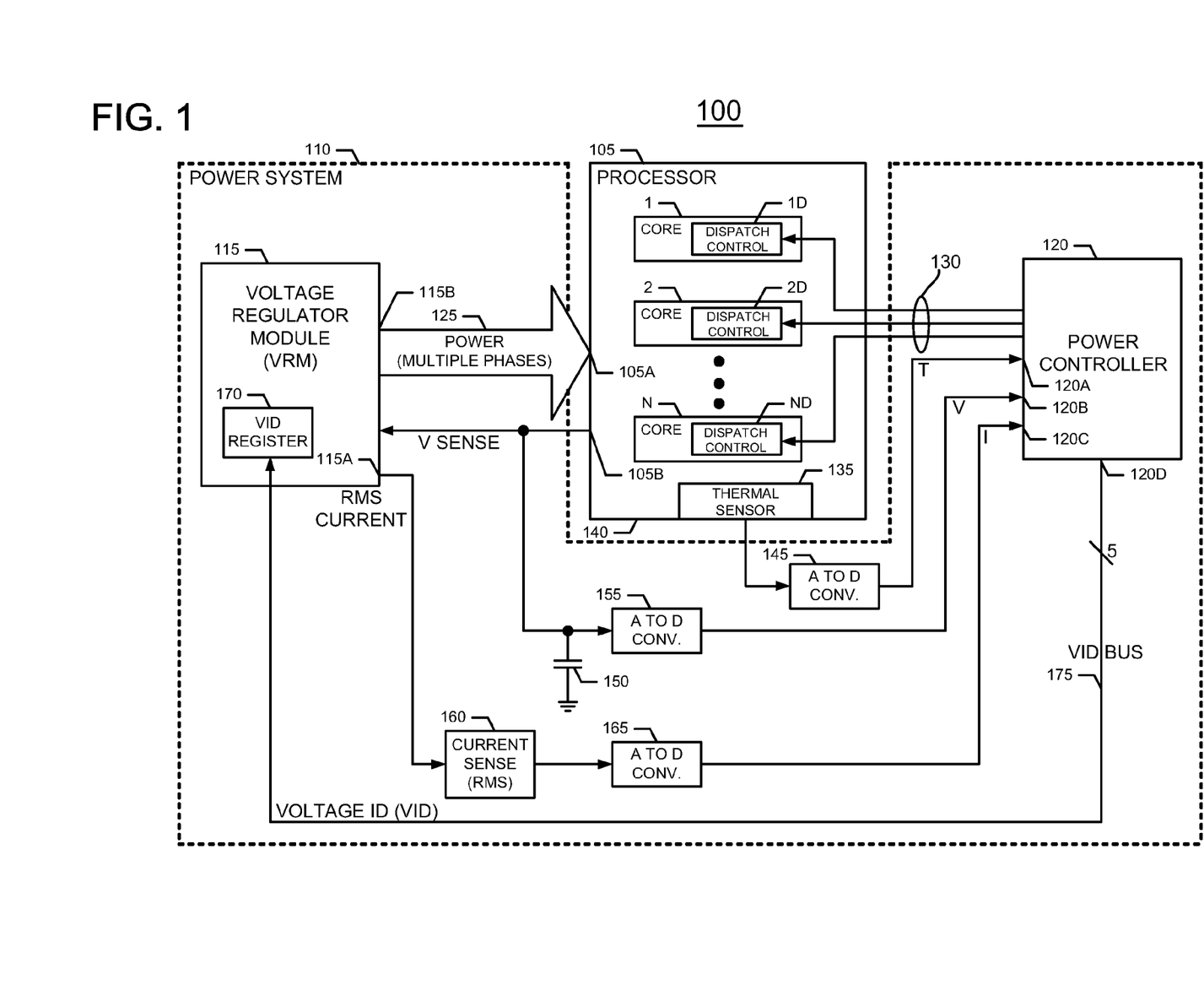
FIG. 1 shows a block diagram of the disclosed processor system.

FIG. 1 shows a block diagram of a processor system 100 that includes a processor 105 that couples to a power system 110. Power system 110 includes a voltage regulator module (VRM) 115 that supplies power to processor 105. Power system 110 also includes a power controller 120 that couples to both processor 105 and VRM 115. In one embodiment, power controller 120 is a microcontroller that executes a different instruction set than processor 105. In this manner, power controller 120 may operate independently of processor 105. VRM 115 supplies power to processor 105 under the control of power controller 120. In one embodiments VRM 115 supplies multiple phases of power to processor power input 105A via power conductor 125.

Processor 105 includes processor circuitry such as multiple processor cores 1, 2, . . . N wherein N is the total number of processor cores. Each processor core includes a respective instruction pipeline (not shown). Each processor core also includes a dispatch control circuit that controls the rate of dispatch of instructions into the core's pipeline. For example, processor core 1 includes a dispatch control circuit 1D, processor core 2 includes a dispatch control circuit 2D, and so forth up to processor core N that includes a dispatch control circuit ND. Processor cores 1, 2, . . . N couple to power controller 120 via control bus 130 to enable power controller 120 to control the instruction dispatch rates of the respective processor cores. More specifically, each of dispatch control circuits 1D, 2D, . . . ND couples via control bus 130 to power controller 120. Power controller 120 determines the instantaneous power that processor 105 consumes, and if this power exceeds a predetermined threshold power level, then power controller 120 may instruct one or more of dispatch control circuits 1D, 2D, . . . ND to throttle or reduce the speed at which their respective processor cores 1, 2, . . . N dispatch instructions for execution. Throttling back the dispatch rates in this manner reduces the power that a throttled processor core consumes, and thus reduces the total power that processor 105 consumes. Throttling the dispatch rate in this manner includes not only reducing the dispatch rate by a dispatch control circuit but also clock gating by a dispatch control circuit so that a respective processor core halts execution of instructions for an amount of time.

Processor 105 includes a thermal sensor 135 on the same semi-conductor die or substrate 140 as processor 105. An A/D converter 145 couples between thermal sensor 135 and power controller temperature input 120A to continuously inform power controller 120 of the temperature that processor 105 presently exhibits.

Processor 105 includes a voltage sense output 105B that supplies a sense voltage, V SENSE, that corresponds to the supply voltage that the internal circuits of processor 105 see as a result of the power that VRM 115 supplies to processor 105. In other words, VSENSE is the voltage that the internal circuits of processor 105 see at the die level taking into account IR voltage drops between the supply of VRM 115 and processor 105. The voltage sense output 105B of processor 105 couples to VRM 115 to inform VRM 115 with respect to the present internal supply voltage that processor 105 sees, namely the VSENSE voltage. A capacitor 150 couples between voltage sense output 105B and ground. An A/D converter 155 couples between voltage sense output 105B and power controller voltage input 120B to inform power controller 120 with respect to the instantaneous internal supply voltage, VSENSE, that processor 105 presently exhibits.

VRM 115 includes a current output 115A that couples via current sensor 160 and A/D converter 165 to the current input 120C of power controller 120. In this manner, A/D converter 165 continuously informs power controller 120 of the instantaneous current that processor 105 draws from VRM 115 via power conductor 125.

Thus, A/D converters 145, 155 and 165 continuously supply power controller inputs 120A, 120B and 120C with processor die temperature information, processor voltage information and processor current information, respectively. This temperature information, voltage information and current information may vary over time. Power controller 120 dynamically determines the instantaneous power drawn by processor 105 from VRM 115 by multiplying the voltage information with the current information at different points in time. In one embodiment, the points in time are periodic. In another embodiment, the points in time are non-periodic or aperiodic. If power controller 120 determines that the power processor 105 consumes exceeds a predetermined power level, then power controller 120 may take a number of different actions to reduce power consumption. In one embodiment, power controller 120 may instruct one or more of cores 1, 2, . . . N to slow down the execution of instructions in their respective pipelines. For example, power controller 120 may send a control signal to dispatch control circuit 1D of processor core 1 to reduce the rate of instruction dispatch. If power controller 120 determines that the power drawn by processor 105 still exceeds the predetermined power threshold, then power controller 120 may instruct another of the processor cores, for example processor core 2 to reduce its instruction dispatch rate. Power controller 120 repetitively monitors the power drawn by processor 105. Once the power drawn by processor 105 drops below the predetermined threshold power, power controller 120 may instruct the dispatch controllers of the respective cores to increase their dispatch rates. In this manner, power controller 120 manages the power drawn by processor 105 when it executes instructions that would otherwise cause intensive processor activity that exceeds a predetermined desirable power level.

In another embodiment, when the power that processor 105 draws exceeds a predetermined threshold, power controller 120 may instruct one or more of processor cores 1, 2, . . . N to commence clock gating. For example, power controller 120 may send a signal to dispatch control circuit 1D via control bus 130 to instruct dispatch control circuit 1D to commence clock gating. In this event, dispatch control circuit 1D clock gates or turns off the clock signal to one or more stages in the pipeline (not shown) of processor core 1. This action causes the power that processor 105 draws to decrease. If the power that processor 105 draws is still not less than the predetermined threshold power level, power controller 120 may instruct another processor core to clock gate. For example, power controller 120 may instruct dispatch control circuit 2D of processor core 2 to commence clock gating. In this instance, dispatch control circuit 2D causes the issuance of instructions to the pipeline of processor core 2 to cease. In combination with these clock gating actions, power controller 120 may also instruct other processor cores to reduce the dispatch rate of instructions to their respective pipelines, thus reducing the power that processor 105 draws from VRM 115. Once the power draw of processor 105 returns to a value less than the predetermined threshold power level, power controller 120 may instruct one or more of the processor cores to cease clock gating or to increase their respective dispatch rates.

While system 100 may power throttle as shown above, system 100 may also thermally throttle processor 105. A/D converter 145 continuously provides input 120A of power controller 120 with the instantaneous temperature of semiconductor die 140. If the temperature of processor 105 exceeds a predetermined threshold temperature, power controller 120 may instruct one or more of processor cores 1, 2, . . . N to commence instruction dispatch rate reduction or clock gating. When processor 105 cools sufficiently that it's temperature no longer exceeds the predetermined threshold temperature, then power controller 120 may instruct one or more of the processor cores to cease instruction dispatch rate reduction and/or clock gating.

When power controller 120 initiates power throttling or thermal throttling, this throttling action causes processor 105 to exit its normal full power mode and enter a throttled mode in which processor 105 draws less power from VRM 115. When power controller 120 does not initiate power throttling or thermal throttling, processor 105 operates in the normal full power mode. It is also possible for processor 105 to enter a low power state such as a sleep state or hibernation state.

Voltage regulator module (VRM) 115 is a regulated power supply that includes a voltage identification (VID) register 170. VRM 115 provides a variable regulated DC supply voltage at main output 115B. The output voltage of VRM 115 varies directly with the particular VID value that VID register 170 stores. In one representative embodiment, VID register 170 stores a 5 bit VID value that determines the VRM output voltage. Fewer or more bits than 5 are usable as the VID depending on the particular application. In processor system 100, power controller 120 includes an output 120D that couples to VID bus 175. VID bus 175 couples power controller output 120D to the VID register 170 of VRM 115. In this manner, power controller 120 supplies a 5 bit VID value to VID register 170 that controls the output voltage that VRM 115 generates at main output 115B. Different VID values from power controller 120 result in different output voltage values at VRM main output 115B.

In one embodiment, power controller 120 dynamically adjusts the value of the VID on VID bus 175 over time to increase the accuracy of the output voltage that VRM 115 supplies processor 105. When power controller 120 causes processor 105 to enter a throttled mode or when processor 105 operates in full power mode, in both of these cases power controller 120 may also increase or decrease the voltage that VRM 115 supplies processor 105 to more precisely match the voltage that the VID instructs. Power controller 120 can access accurate voltage readings from A/D 155 and accurate current readings from A/D 160. Thus, power controller 120 can accurately measure the VRM 115 actual voltage that processor 105 sees and determine the expected voltage of VRM 115 based on the measured current and a load line. With this information, power controller 120 adjusts the VID on VID bus 175 to counteract the tendency of circuit components and resultant voltages to drift over time. In other words, given the actual voltage information from A/D 155 and the actual current information from A/D 165, power controller 120 knows the actual voltage that processor 105 sees at the die level and further knows the power that processor 105 consumes. Power controller 120 also knows the VID value that it supplies to VID register 170 of the VRM that results in the actual voltage that processor 105 sees. This VID value corresponds to an expected voltage that VRM 115 produces. Power controller 120 alters the VID value over time to change the actual voltage that processor 105 sees to approximately equal or more closely approximate the original expected VRM output voltage that the designer specified.

In one approach, the designer specifies an original expected output voltage for VRM 115 and sets the VID value that power controller 120 generates on the VID bus 175 to instruct VRM 115 to generate this original expected output voltage. Power controller 120 uses A/D converter 155 to measure the actual voltage that processor 105. The actual voltage that processor 105 sees may vary over time due to the tendency of circuit components and resultant voltages to drift over time. Power controller 120 varies the VID to change the expected output voltage, and correspondingly the actual output voltage that processor 105 sees, to compensate for variation in the actual output voltage over time. In this manner, power controller 120 causes the voltage that processor 205 actually sees to more closely approximate the voltage that the VID instructs.

In a representative embodiment, VRM 115 generates an output voltage at output 115B that is variable within the overall range of 0.8 volts to 1.4 volts. In the case of representative VRM 115 once the VRM output voltage is set by a particular VID, the actual output voltage is accurate within a range of plus or minus 20 mV of the programmed output voltage. Within the overall range of 0.8 volts to 1.4 volts, the VID is changeable to vary the output voltage in 12.5 mV steps in one case or 6.25 mV steps in another case. Other voltage ranges and other voltage step sizes are also possible depending on the particular application. While immediately after manufacture the voltage that a particular VID instructs the VRM to generate may be very accurate, the actual voltage that processor 105 sees internally, namely V SENSE, may vary and drift over time such as several days, weeks, months or years. The disclosed methodology enables the power controller to periodically or aperiodically monitor the internal processor voltage and add one or more voltage steps if that voltage is too low, or subtract one or more voltage steps if the voltage is too high. In this manner, power system 110 provides dynamic correction of the processor voltage over time.

Figure 2:
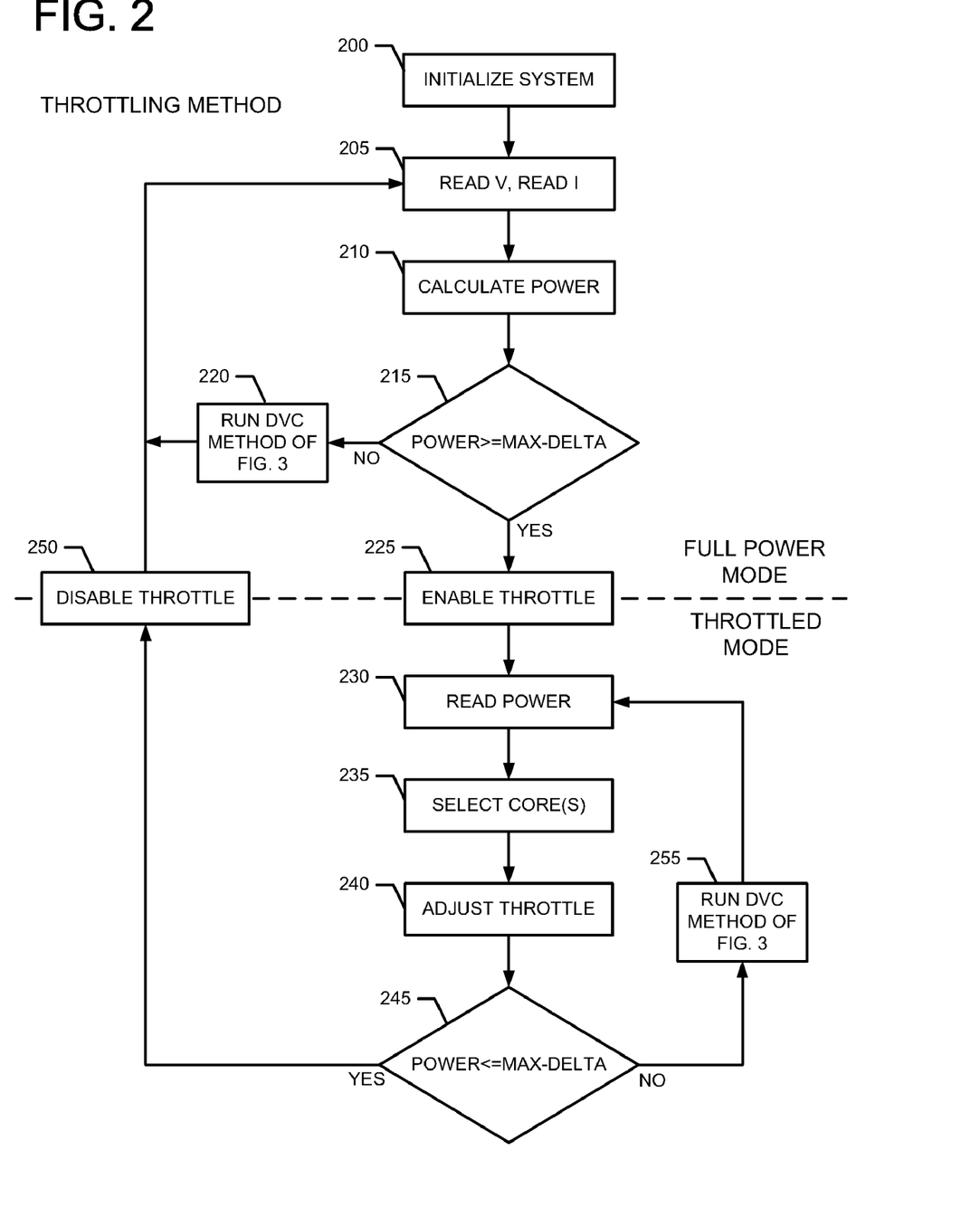
FIG. 2 is a flowchart that shows a methodology for operating the disclosed processor system in a full power mode and a throttled mode.

FIG. 2 is a flow chart that depicts one embodiment of the throttling methodology described above. Operation commences when system 100 initializes at block 200. More particularly, processor 105 and power controller 120 initialize in block 200 with each device running a different instruction set. Power controller 120 reads the instantaneous voltage V from A/D converter 155 and further reads the instantaneous current I from A/D converter 165, as per block 205. Power controller 120 determines the instantaneous power that processor 105 presently consumes by multiplying the instantaneous voltage by the instantaneous current, as per block 210. At this point in time, processor 105 operates in a full power mode with no power or thermal throttling. It is also possible that processor 105 may operate in a low power state such as a sleep state or hibernation state.

Power controller 120 conducts a test to determine if the present instantaneous power is greater than a predetermined threshold power value, as per test block 215. For example, the predetermined threshold power value may equal a maximum power minus a delta value (MAX−DELTA). The maximum power is a power value that represents the highest power level at which processor 105 may safely operate. The delta value is an arbitrary difference that is selectable to determine the trigger point at which throttling begins. If the test of block 215 determines that the present instantaneous power is not greater than the predetermined threshold power value, then processor 105 does not enter the throttled mode. Rather, under these circumstances, system 100 performs the dynamic voltage correction (DVC) method shown in FIG. 3, as per block 220 of FIG. 2. After performing the method of FIG. 3, process flow returns back to the method of FIG. 2 and power controller 120 again reads the instantaneous voltage and current values at block 205. Power controller 120 again determines the present instantaneous power that processor 105 consumes, as per block 210. If the instantaneous power now exceeds the predetermined threshold power value, then processor 105 enters a throttled mode by enabling throttling, as per block 225.

For example, processor 105 may enter a power throttled mode by determining the present instantaneous power that processor 105 draws from the present instantaneous voltage and current values, as per block 230. In actual practice, power controller 105 may read and use the power that block 210 determines. In this power throttling mode, power controller 120 takes action to reduce the amount of power that processor 105 consumes until that power is less than the predetermined threshold power value. To reduce power consumption, power controller 120 selects one or more processor cores 1, 2, . . . N, to power throttle, as per block 235. For example, power controller 120 may select processor core 1 to throttle. Power controller 120 then adjusts the throttle with respect to processor core 1 by instructing dispatch control unit 1D in processor core 1 to reduce the instruction dispatch rate therein, as per adjust throttle block 240. Power controller 120 then conducts a test to determine if the power that processor 105 now draws is less than the predetermined threshold power value, as per test block 245. If the power that processor 105 is still not less than the predetermined threshold power value, then power controller 120 may more aggressively throttle processor core 1, and/or throttle other processor cores as well. Moreover, to reduce processor power consumption, power controller 120 may clock gate one or more of the processor cores, thus momentarily stopping instruction flow in those cores. After such additional power throttling activities, power controller 120 again tests to determine if the present power drawn by processor 105 is less than the predetermined threshold power value, as per decision block 245. If power controller 120 now finds that the power drawn is less than the predetermined threshold power value, then power controller 120 disables throttling as per block 250 and process flow continues back to read voltage and read current block 205.

In one embodiment, while in the throttle mode, power controller 120 may conduct thermal throttling in addition to, or instead of, power throttling. Power controller 120 monitors the instantaneous temperature of processor 105 that thermal sensor 135 and A/D converter 145 provide. In other words, power controller 120 reads the temperature of processor 105 in addition to the power that processor 105 presently consumes. If the temperature of processor 105 is more than a predetermined threshold temperature value and/or the power that processor 105 presently consumes is greater than the predetermined threshold power value, then power controller 120 adjusts the throttling of one or more processor cores 1, 2 . . . N, as described above with respect to adjust throttle block 240. Power controller 120 then tests to determine if the instantaneous temperature is now less than the predetermined threshold temperature value, and if so process flow continues back to read block 205 via disable throttle block 250.

Figure 3:
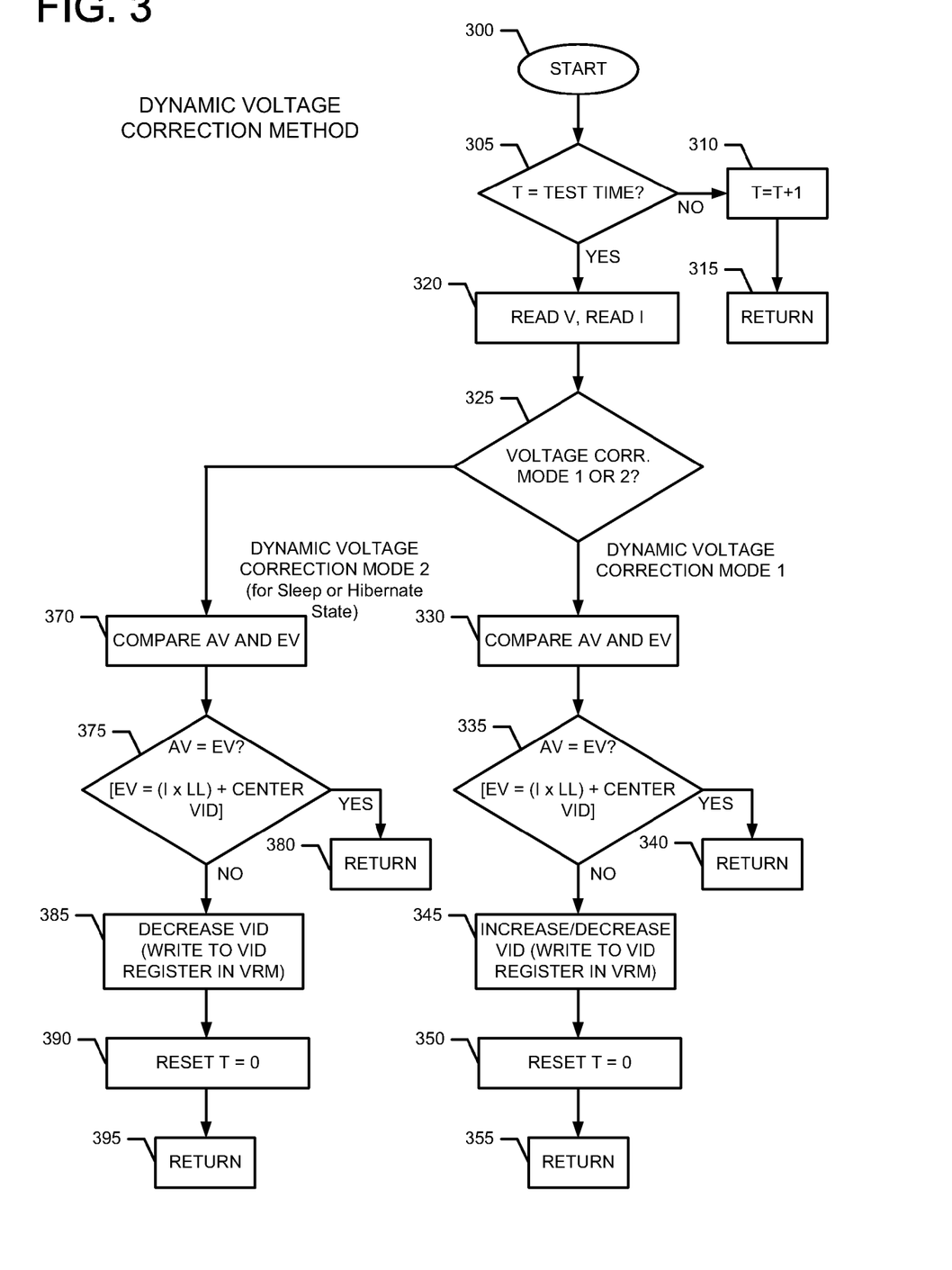
FIG. 3 is a flowchart that shows a methodology for operating the disclosed processor system in dynamic voltage correction modes.

In one embodiment, when power controller 120 adjusts the power throttle as per block 240 and the resultant instantaneous power is not less than the predetermined threshold power value, then power controller 120 carries out the dynamic voltage correction method of FIG. 3, as per block 255, before process flow continues back to read power block 230.

FIG. 3 is a flowchart that depicts one embodiment of the dynamic voltage correction methodology that corrects for undesired drift and changes in the processor supply voltage over time. In one embodiment, power controller 120 performs the dynamic voltage correction method when power controller 120 encounters RUN DVC blocks 220 or 255 of the FIG. 2 flowchart. Returning to the FIG. 3 flowchart, the dynamic voltage correction method commences at start block 300. Power controller 120 performs the dynamic voltage correction periodically or aperiodically over time. Power controller 120 tests to determine if it is now time to perform this correction method, as per block 305. For example, block 305 tests to determine if time T currently equals TEST TIME. If time T does not equal TEST TIME, then power controller 120 increments time T, as per block 310, and process flow returns via return block 315 to DVC block 220 or DVC block 255 of the throttling method of FIG. 2.

Power controller 120 tests to determine if it should enter a dynamic voltage correction (DVC) mode 1 or a dynamic voltage correction (DVC) mode 2, as per test block 325. Power controller 120 selects DVC mode 1 if system 100 currently operates in the full power mode or throttled mode. However, power controller 120 selects DVC mode 2 if processor 105 currently operates in a very low power state such as a sleep state or a hibernation state. In such a sleep or hibernation state, processor 105 no longer actively executes program application code that can correctly operate at a lower voltage setting further providing power savings, but rather waits for the user or other event to wake up and restore the system to full power mode or throttled mode. When processor 105 is in full power mode or throttled mode, it still may execute application software, but at a slower rate in the throttled mode. However, when in a sleep or hibernation state, processor 105 does not execute application program code, in one embodiment. Thus, depending on whether processor 105 current is in full power/throttled mode or a very low power state (such as a sleep or hibernation state) determines whether decision block 325 selects the path for DVC mode 1 or DVC mode 2, respectively.

If processor 105 is in the full power mode or throttled mode, power controller 120 compares the actual voltage (AV) that it reads from A/D converter 155 with the expected voltage (EV) that it expects to read from A/D converter 155, as per block 330. The expected voltage (EV) is the voltage that power controller 120 instructs VRM 115 to send to processor 105, namely the voltage that corresponds to the VID that power controller 120 sends to VRM 115. If test block 335 determines that the actual voltage (AV) equals the expected voltage (EV), then process flow returns via return block 340 to DVC method block 220 or DVC method block 255 of the FIG. 2 flowchart. However, if decision block 335 determines that the actual voltage (AV) does not equal the expected voltage (EV), then power controller 120 takes corrective action by increasing or decreasing the VID to correct for the amount by which the voltage to processor 105 is either low or high, respectively, as per block 345. In actual practice, power controller 120 performs this correction by writing a corrected VID in the VID register 170 of VRM 115. VRM 115 sets the granularity of possible voltage adjustments. In one embodiment, VRM 115 may adjust its output voltage in steps such as 6.25 mV or 12.5 mV steps. For such voltage adjustment of the expected output voltage to be worthwhile, the amount of voltage drift in the actual output voltage should be at least half the steps size. After correcting the supply voltage, power controller 120 sets time T to zero, as per block 350, so that the next time the method of FIG. 3 runs, the power controller can again check to determine if a sufficient amount of time passed before it again performs the DVC method. The time count T continues to increase for those times when power controller 120 does not perform the DVC method of FIG. 3, so that the power controller perform successive DVC tests over time. The DVC method then completes and process flow continues via return block 355 to DVC method block 220 or DVC method block 255 of the FIG. 2 flowchart.

If test block 325 determines that processor 105 is currently in a very low power state such as a sleep state or a hibernate state, then power controller 120 enters dynamic voltage correction mode 2 to reduce the voltage that VRM 115 supplies to processor 105 for greater efficiency. Power controller 120 compares the actual voltage (AV) that it reads from A/D converter 155 with the expected voltage (EV) that it expects to read from A/D converter 155, as per block 370. If test block 375 determines that the actual voltage (AV) equals the expected voltage (EV), then process flow returns via return block 380 to DVC method block 220 or DVC method block 255 of the FIG. 2 flowchart. However, if decision block 375 determines that the actual voltage (AV) does not equal the expected voltage (EV), then power controller 120 decreases the VID to reduce the voltage that VRM 115 supplies to processor 105, as per block 385. In power managed modes including lower frequency operation and/or reduced function, the system 100 circuitry can operate successfully at lower voltages than necessary for full power operation. This allows programming of VRM 115 to a lower VID setting at register 170 after entering the power managed state. The resultant voltage decrease can be significant depending on the amount of frequency or function reduction that the system supports. In one embodiment, the voltage decrease may be one VID step or several VID steps up to hundreds of millivolts. Power controller 120 performs this correction by writing a corrected VID in the ID register 170 of VRM 115.

Figure 4:
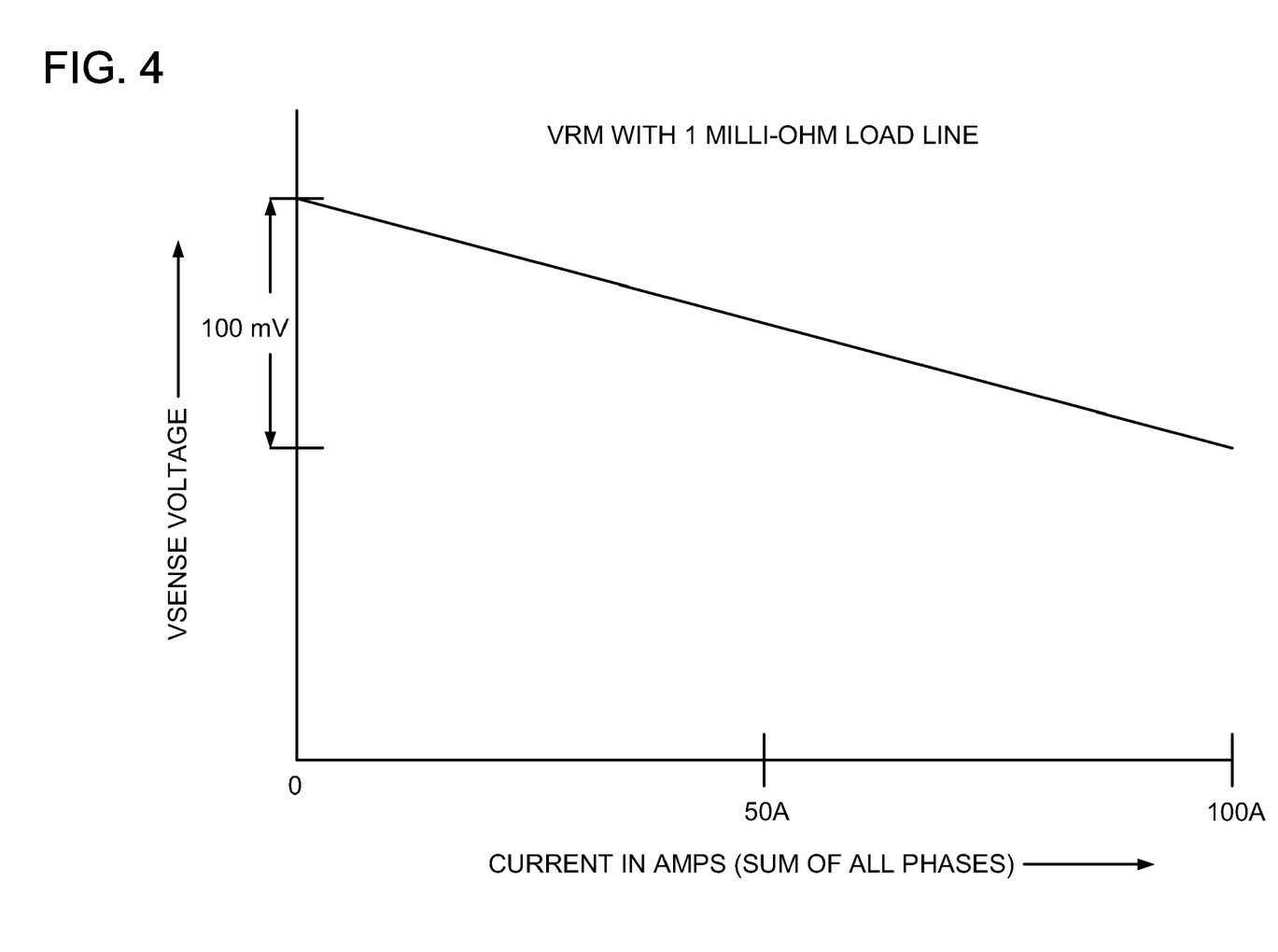
FIG. 4 is a representative load line for the disclosed processor system.

FIG. 4 is a load line for VRM 115 that depicts current on the x axis and the VSENSE voltage on the y axis. In one embodiment, VRM 115 is a load line regulator type VRM that droops to its lowest output voltage at the maximum power point. The benefit of this configuration is that if processor 105 places a sudden demand for power on VRM 115, the voltage that decoupling capacitors (in the VRM, but not shown) store is higher due to having been up the load line and therefore there is more stored energy available to supply the sudden current demand before the VRM can react. This allows reduced droop on the VRM power supply and makes cost reductions possible by limiting the amount of decoupling that the other circuitry of system 100 requires.

When a designer implements VRM 115 with a load line such as in FIG. 4, VRM 115 will provide an output voltage based on the VID setting of VID register 170 and the internal current measurement at 115A. For a VRM 115 with a 1 milli-ohm load line as shown in FIG. 4, the voltage VSENSE at 105B equals the VID setting voltage with a tolerance minus (current measured in amps×0.001 V).

An ideal VRM 115 will provide a VSENSE reading of EV=(I×LL)+CENTER VID where EV is the expected voltage that VRM 115 provides, I is the measured current that VRM 115 provides and LL is the load line in volts. By taking actual current and voltage measurements from A/D converters 165 and 155, respectively, the actual performance of the VRM 115 is measurable and comparable with the expected ideal. These measurements determine if further adjustments in the VID setting are necessary to improve the accuracy of the VSENSE voltage that processor 105 sees.

Figure 5:
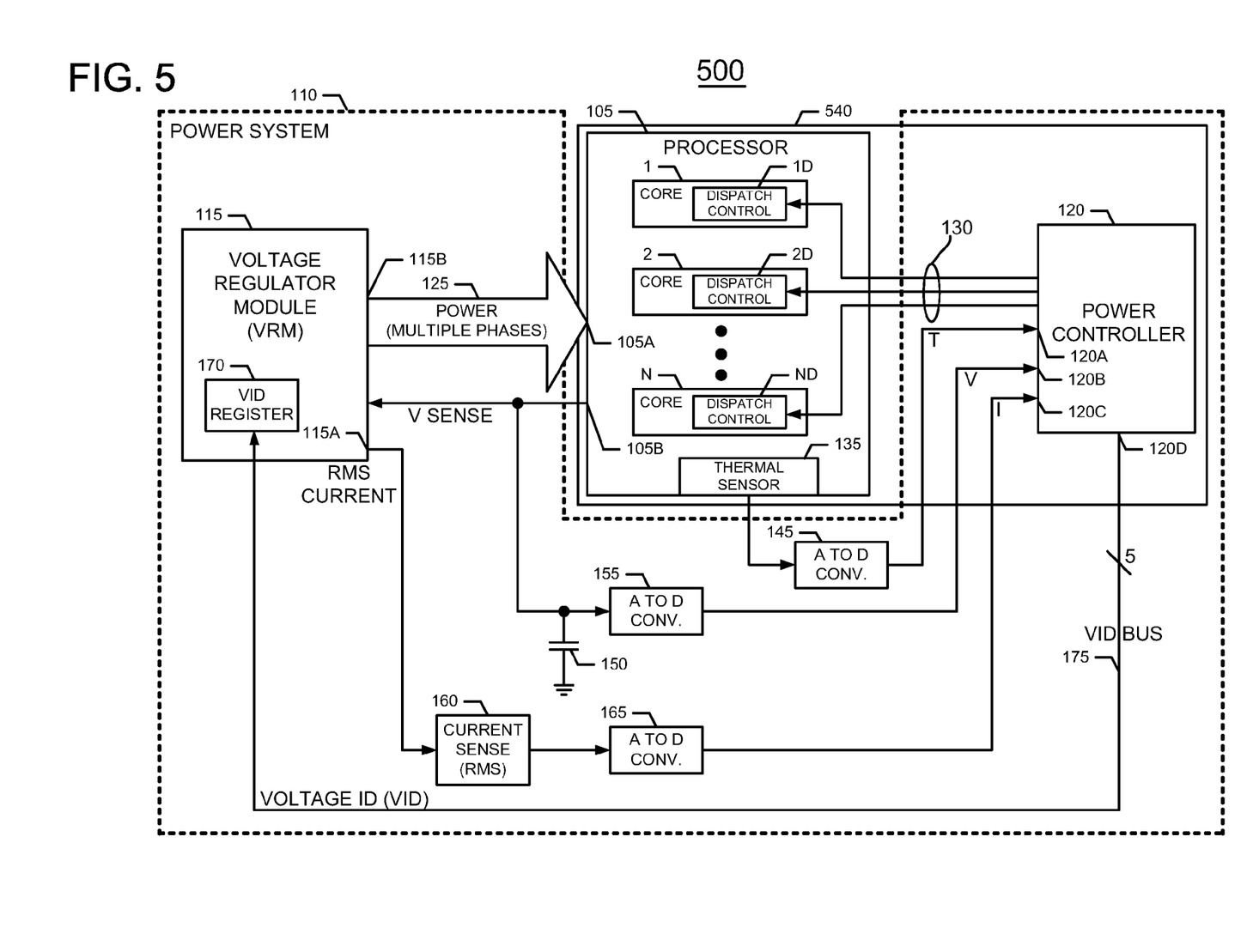
FIG. 5 is a block diagram of another embodiment of the disclosed processor system that includes both a processor and power controller on a common semiconductor die.

FIG. 5 is a block diagram of a processor system 500 that is similar to processor system 100 of FIG. 1, except that in processor system 500 of FIG. 5 semiconductor die or substrate 540 is an integrated circuit that includes both processor 105 and power controller 120 thereon. Power controller 120 of FIG. 5 is still independent of processor 105 in the sense that processor 105 and power controller 120 execute different instruction sets of code. If processor 105 powers down partially or fully, power controller 120 is still operational to monitor power and thermal conditions. Power controller 120 cooperates with A/D converters 145, 155 and 165 to accurately measure thermal conditions on the semiconductor die 540, the voltage that processor 105 sees internally and the current that processor 105 draws, respectively.

Figure 6:
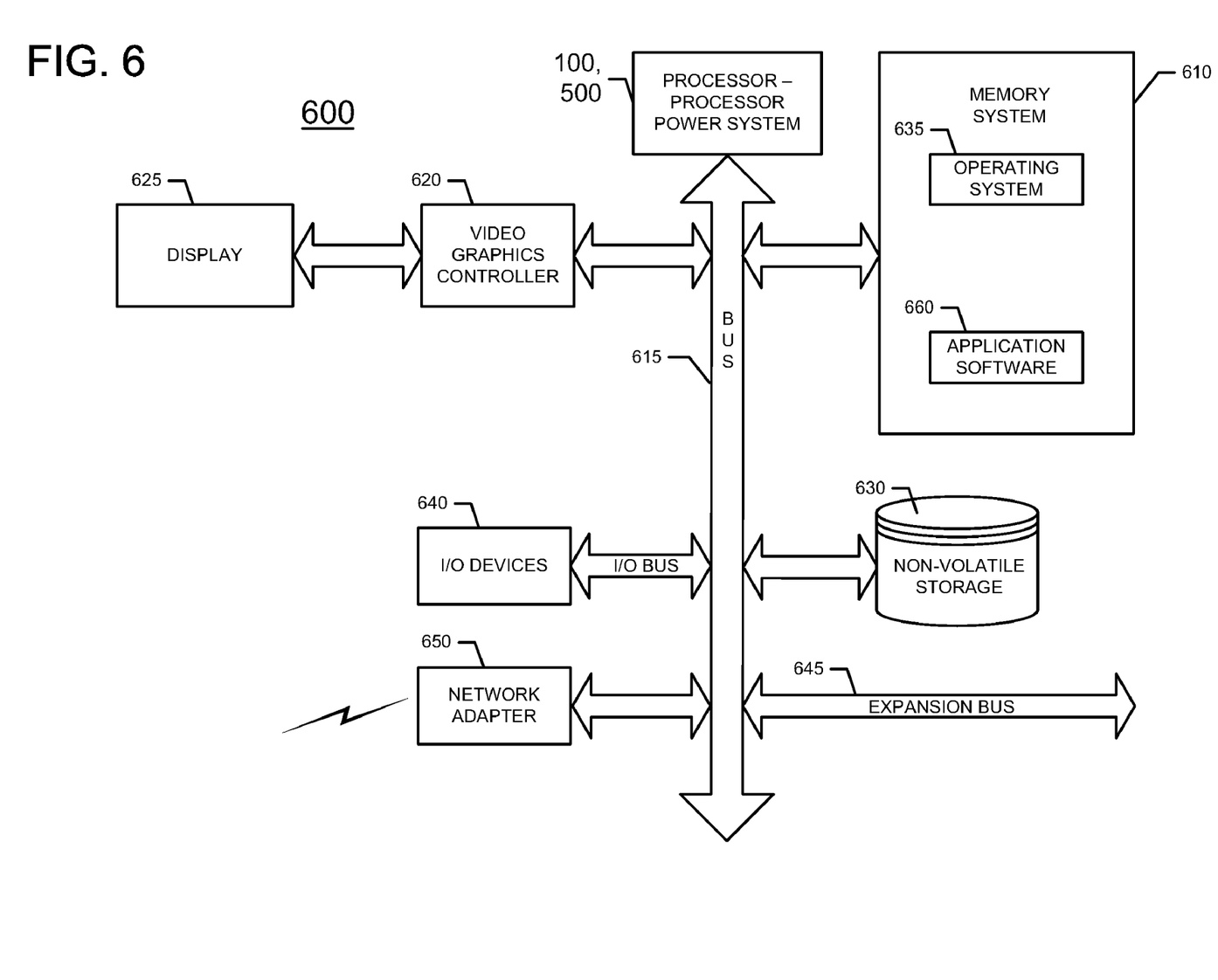
FIG. 6 is an information handling system (IHS) that employs the disclosed processor system.

FIG. 6 shows an information handling system (IHS) 600 employing a processor-processor power system 100, 500 that uses the disclosed power control technology. In one embodiment, the processor-processor power system 100, 500 employs a heterogeneous processor, namely a processor including at least one general processor unit having a first instruction set and at least one other processor unit having an architecture and instruction set different from that of the general purpose processor. For example, the other processor may be a specialized processor unit or special purpose processor. Processor-processor power system 100 or 500 couples to memory system 610 via a bus 615. Bus 615 also couples processor-processor power system 100, 500 to a video graphics controller 620. A display 625 couples to video graphics controller 620. Nonvolatile storage 630, such as a hard disk drive, CD drive, DVD drive, or other nonvolatile storage couples to bus 615 to provide IHS 600 with permanent storage of information. An operating system 635 loads in memory 610 to govern the operation of IHS 600. I/O devices 640, such as a keyboard and a mouse pointing device, couple to bus 615. One or more expansion busses 645, such as USB, IEEE 1394 bus, ATA, SATA, PCI, PCIE and other busses, couple to bus 615 to facilitate the connection of peripherals and devices to IHS 600. A network adapter 650 couples to bus 615 to enable IHS 600 to connect by wire or wirelessly to a network and other information handling systems. While FIG. 6 shows one IHS that employs processor-processor power system 100, 500, the IHS may take many forms. For example, IHS 600 may take the form of a desktop, server, portable, laptop, notebook, or other form factor computer or data processing system. IHS 600 may take other from factors such as a personal digital assistant (PDA), a gaming device, a portable telephone device, a communication device or other devices that include a processor and memory.

The foregoing discloses a power control system for a processor that operates in multiple modes to conserve power and assure reliable operation of the processor.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of providing power to a processor that includes processor circuitry on a semiconductor substrate, the method comprising:

supplying, by a power system, power to the processor wherein the processor circuitry includes a plurality of cores;

throttling, by the power system, at least one core of the processor if power that the processor consumes from the power system exceeds a predetermined threshold power thus placing the processor in a power throttled mode;

determining, by the power system, an actual output voltage that the processor circuitry in the processor receives from the power system; and varying, by the power system, the actual output voltage dynamically over time in response to a detected difference between the actual output voltage and an expected output voltage of the power system.

2. The method of claim 1, further comprising generating, by the power system, an output voltage identification signal that controls the expected output voltage.

3. The method of claim 2, wherein the varying step comprises changing, by the power system, the output voltage identification signal to increase the actual output voltage if the actual output voltage is lower than the expected output voltage.

4. The method of claim 2, wherein the varying step comprises changing, by the power system, the output voltage identification signal to decrease the actual output voltage if the actual output voltage is higher than the expected output voltage.

5. The method of claim 1, wherein the throttling step comprises reducing, by the power system, a rate at which at least one of the cores dispatches instructions.

6. The method of claim 1, wherein the throttling step comprises clock gating, by the power system, at least one of the cores.

7. The method of claim 1, further comprising operating, by the processor, in a full power mode if the power that the processor consumes from the power system does not exceed the predetermined threshold power.

8. The method of claim 1, wherein the power system performs the varying step to reduce the actual output voltage when the processor enters one of a sleep state and a hibernation state.

9. A processor system comprising:
- a processor that includes processor circuitry having a plurality of cores situated on a semiconductor substrate;
- a power system, coupled to the processor, that supplies power to the processor, the power system including:
  - a power controller that throttles at least one core of the processor if the processor consumes more than a predetermined threshold power, thus placing the processor in a power throttled mode;
  - a sensor, coupled to the processor circuitry and the power controller, that senses an actual output voltage that the processor circuitry receives from the power system; and
  - a voltage regulator, coupled to the power controller and the processor, that varies the actual output voltage dynamically over time under the control of the power controller in response to a difference the power controller detects between the actual output voltage and an expected output voltage of the voltage regulator.

10. The processor system of claim 9, wherein the power controller generates an output voltage identification signal that corresponds to the expected output voltage.

11. The processor system of claim 10, wherein the power controller changes the output voltage identification signal to increase the actual output voltage if the actual output voltage is lower than the expected output voltage.

12. The processor system of claim 10, wherein the power controller changes the output voltage identification signal to decrease the actual output voltage if the actual output voltage is higher than the expected output voltage.

13. The processor system of claim 9, wherein the power controller throttles the processor by reducing the rate at which at least one of the cores dispatches instructions.

14. The processor system of claim 9, wherein the power controller throttles the processor by clock gating at least one of the cores.

15. The processor system of claim 9, wherein the power controller allows the processor to operate in a full power mode if the power that the processor consumes from the power system does not exceed the predetermined threshold power.

16. The processor system of claim 9, wherein the power controller instructs the voltage regulator to reduce the actual output voltage when the processor enters one of a sleep state and a hibernation state.

17. An information handling system (IHS) comprising:
- a processor that includes processor circuitry having a plurality of cores situated on a semiconductor substrate;
- a memory coupled to the processor; and
- a power system, coupled to the processor, that supplies power to the processor, the power system including:
  - a power controller that throttles at least one core of the processor if the processor consumes more than a predetermined threshold power, thus placing the processor in a power throttled mode;
  - a sensor, coupled to the processor circuitry and the power controller, that senses an actual output voltage that the processor circuitry receives from the power system; and
  - a voltage regulator, coupled to the power controller and the processor, that varies the actual output voltage dynamically over time under the control of the power controller in response to a difference the power controller detects between the actual output voltage and an expected output voltage of the voltage regulator.

18. The IHS of claim 17, wherein the power controller generates an output voltage identification signal that corresponds to the expected output voltage.

19. The IHS of claim 18, wherein the power controller changes the output voltage identification signal to increase the actual output voltage if the actual output voltage is lower than the expected output voltage.

20. The IHS of claim 18, wherein the power controller changes the output voltage identification signal to decrease the actual output voltage if the actual output voltage is higher than the expected output voltage.

* * * * *